United States Patent [19]

Bonig et al.

[11] 3,934,184

[45] Jan. 20, 1976

[54] ARRANGEMENT FOR REGULATING THE SPEED OF AN ASYNCHRONOUS MOTOR

[75] Inventors: Heinrich Bönig, Erlangen; Hermann Waldmann, Weiher, both of Germany

[73] Assignee: Siemens Aktiengesellschaft, Munich, Germany

[22] Filed: July 26, 1973

[21] Appl. No.: 382,883

[30] Foreign Application Priority Data

Aug. 14, 1972 Germany............................ 2239897

[52] U.S. Cl. ................ 318/227; 318/308; 318/327; 318/332; 318/241
[51] Int. Cl.[2]......................................... H02P 5/40
[58] Field of Search .......... 318/227, 230, 231, 241, 318/308, 332, 327

[56] References Cited
UNITED STATES PATENTS

| | | | |
|---|---|---|---|
| 3,413,534 | 11/1968 | Stringer ............................. | 318/308 |
| 3,599,063 | 8/1971 | Nanai................................. | 318/332 |
| 3,716,772 | 2/1973 | Larson ............................... | 318/332 |
| 3,735,225 | 5/1973 | Raatz................................. | 318/332 |
| 3,743,906 | 7/1973 | Torok ................................ | 318/327 |
| 3,775,651 | 11/1973 | Graf................................... | 318/227 |

*Primary Examiner*—James R. Scott
*Assistant Examiner*—John J. Feldhaus
*Attorney, Agent, or Firm*—Kenyon & Kenyon Reilly Carr & Chapin

[57] ABSTRACT

An improved arrangement for regulating the speed of an asynchronous motor in which an real performance regulator is inserted between the speed regulator and the means controlling the input voltage and/or current to the motor. The subsidiary regulator inserted between the speed control and the motor control circuits receives as an input a value of the real power which is proportional to the torque or traction force thereby resulting in linear control of the motor based on its actual performance.

6 Claims, 1 Drawing Figure

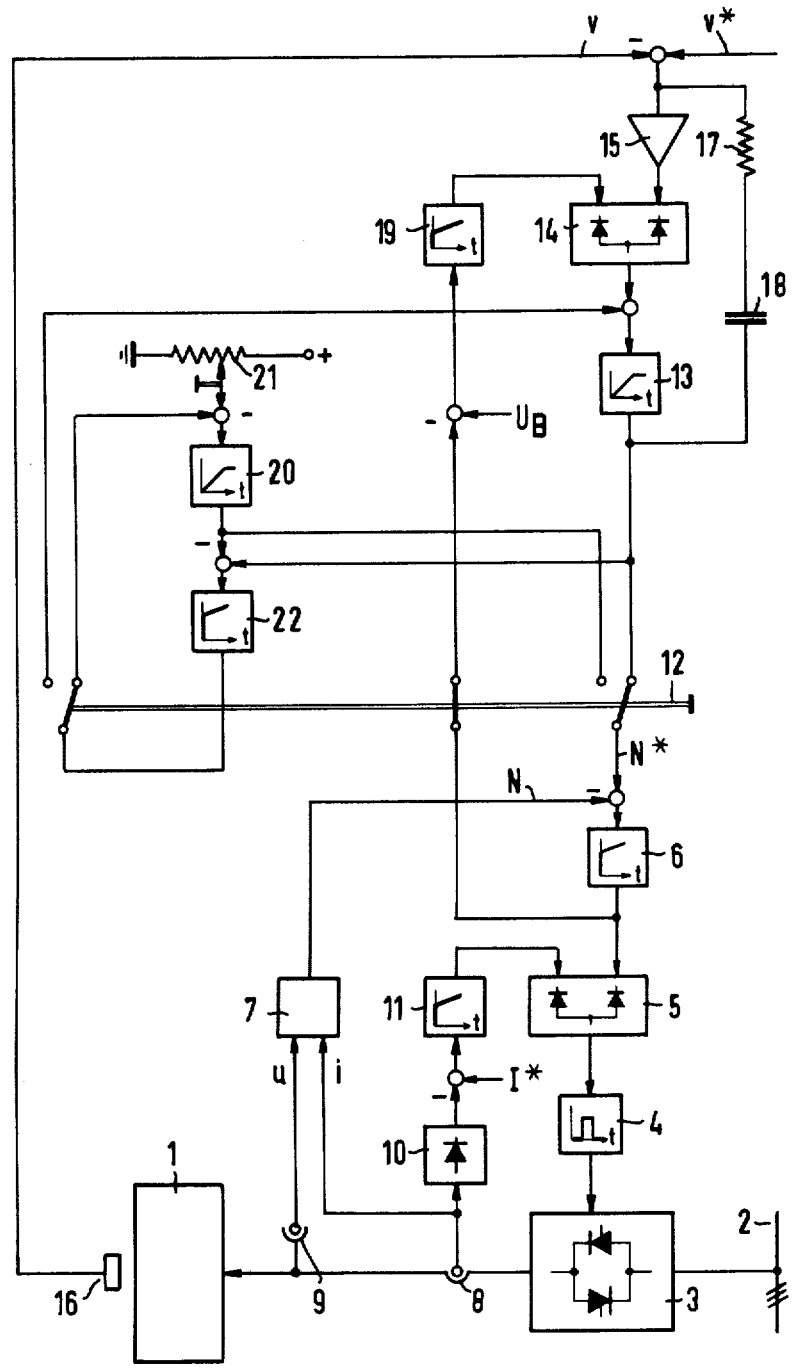

ARRANGEMENT FOR REGULATING THE SPEED OF AN ASYNCHRONOUS MOTOR

BACKGROUND OF THE INVENTION

This invention relates to asynchronous motors in general and more particularly to an improved arrangement for regulating the speed of such motors.

In the prior art, systems have been proposed, for example in German Auslegeschrift 1,806,769, for improving the speed regulation in an asynchronous polyphase linear motor by using an auxiliary regulating control which has as an input the torque of the machine. In this system, the torque is determined using a relatively complicated actual value computer which simulates the fluxes occurring in the machine. Although such a system results in a linear relationship between the main and auxiliary control magnitudes, which is needed for optimum regulation, i.e., between the speed control and the torque control, the use of such an real value computer entails substantial expense. Thus, it can be seen that there is a need for a simplified means of providing improved control of asynchronous motors of this type.

SUMMARY OF THE INVENTION

The present invention provides such a control system. In the preferred embodiment of the present invention a real performance control is inserted between the speed control and the control means regulating the voltage and/or current supplied to the motor, e.g. a controlled rectifier. The input to the real performance control is a quantity proportional to the power being provided to the motor. The arrangement of the present invention thus takes advantage of the knowledge that, with a constant primary frequency input and negligable slip, the power provided to an asynchronous machine is almost directly proportional to its torque. Similarly, in the case of asynchronous polyphase linear motor, it is proportional to the tractive force. Thus through the use of this input proportional to power, an excellent approximation of the torque or tractive force of the machine is obtained and regulation in accordance therewith accomplished. Generally, to obtain the performance indicated by input to the speed regulator, the motor current is not considered. However, in order to prevent a heat overload of the machine, the illustrated embodiment also provides a minimum value circuit between the real performance control and the controlled rectifier or the like which has as a limiting input the output of a current limiting regulator which has as an input a voltage proportional to the real current being supplied to the motor and a voltage proportional to the maximum allowable current. Asynchronous three phase linear motors are gaining widespread use in driving speed regulated high speed vehicles such as vehicles for carrying passengers and freight. When so used, it is generally desirable to limit the amount of jerking which is experienced at the motor. Thus in accordance with a further feature of the present invention the input to the real performance control is provided through top speed regulator circuit which prevents abrupt changes. In addition to prevent oscillations of the actual speed during the correction of regulatory deviations, a second minimum value circuit is included between the speed control amplifier and the top speed regulator. This second minimum value circuit has as its limiting input the output of a limiting circuit which in turn has as inputs a reference voltage and the output of the real performance regulator. Since in some applications it is necessary to be able to have an input which can be controlled directly in proportion to desired torque or traction force, and which also results in being able to limit jerking, means are provided to switch the desired value being input to the real performance control from the speed control to a second top speed regulator which has as an input the output of a variable potentiometer. Because of these two modes of control, i.e., through the speed control or through the torque/tractive force potentiometer, means are further provided to update the one of the controls not in use so that it follows the one which is being used resulting in jerk-free switching back and forth between the two modes of operation.

BRIEF DESCRIPTION OF THE DRAWING

The single FIGURE is a block-circuit diagram of the preferred embodiment of the present invention.

DETAILED DESCRIPTION OF THE PREFERRED EMBODIMENT

As shown on the FIGURE an asynchronous three-phase linear motor 1 is supplied from the three-phase line 2 through a control means 3 which typically may comprise a controlled rectifier which is capable of controlling the amount of power supplied to the motor 1. The motor control 3 is controlled in conventional fashion by a control means 4 which may comprise for example means to provide appropriate output firing pulses to thyristors contained within the controlled rectifier. Such a means receives a voltage input proportional to a desired speed of rotation and converts that into firing pulses to properly fire the thyristor or the like in the motor control 3 in well known fashion.

In various prior art systems the input to the control means 4 has been a voltage developed by comparing an actual speed with a commanded speed. However, as noted above it has been found that an additional control loop which responds to motor torque or tractive force is desirable. Thus there is provided a real performance control 6 which has as its one input the desired value indicated by N* and as a second input a signal N proportional to the real power being supplied to the motor, which as described above approximates the torque or tractive force. (In conventional fashion control 6 adjusts its output up and down in accordance with the difference between its two inputs, i.e., it may comprise an integrator circuit which will integrate to the point where it provides an output which will cause the desired input N* and actual input N to be equal. As long as neither input changes this output will be maintained. A change in either will result in an error causing integration up or down to restore the balance.) This signal is developed in a power computer 7 which has as its inputs a voltage proportional to the current being supplied to the motor, obtained from a current transformer 8 and a voltage proportional to the voltage supplied thereto, obtained from a voltage transformer 9.

To avoid excessive current in the motor and overheating therefrom the output of the actual performance controller 6 is provided through a minimum value circuit 5 comprised of diodes arranged in conventional fashion to result in an output which is the smaller of two inputs. The second input to the minimum value circuit 5 is obtained from a current limiting regulator 11 having as inputs a maximum current I* and a rectified actual current obtained from current transformer 8 and provided through a rectifier 10. As the current measured at the current transformer 8 increases to above the maximum permissible current I* the output of current regulator 11 will become decreasingly smaller so that it effectively regulates the maximum currents applied to the motor 1. The input N* is developed from a speed control comprising an amplifier 15 and a top speed regulator 13. A tachometer or the like 16 provides an input V proportional to the actual speed of the machine 1 which is compared with a commanded speed V* at the input of amplifier 15. The output of amplifier 15 is provided through a second minimum value circuit, identical to that described above, to the top speed regulator 13. Such a top speed regulator may be constructed as described in German patent 1,126,487 and is designed such that the output will always tend to approach the input but that the change of output is controlled so that it does not exceed a predetermined rate. Thus the top speed regulator 13 prevents large input changes from immediately being felt at the output. Through its inclusion jerking is avoided. The output of the top speed regulator 13 is fed back through a capacitor 18 and resistor 17 in series to the input of amplifier 15 to result in a proportional integral control behavior for this portion of the system. The second input to the minimum value circuit 14 is obtained from a regulator 19 which has as its inputs a fixed voltage $\mu_B$ and the output of the real performance regulator 6. As with the regulator 11, regulator 19 will limit the output of the minimum value circuit 14 if the voltage output of controller 6 exceeds that of the voltage $\mu_B$. The regulator 19 may be constructed so that the limiting effect of the voltage $\mu_B$ is applied slowly, in which case the output voltage of the real performance regulator 6 may become greater than the limiting voltage $\mu_B$ momentarily.

In many applications, e.g., in switchyard operation of locomotives or when the motor is used with axle drives, it is desirable that the tractive force be controllable directly. For this purpose a second means for inputting a desired valve and a switch 12 are provided. When operating in this mode the switch 12 is moved to the position not shown, thereby breaking the connection of the top speed regulator 13 and real performance control 6 along with breaking the path from the real performance control 6 to the regulator 19. The input to the controller 6 is now provided from a second top speed regulator 20 which has as its input the ouput of a potentiometer 24 which may be manually controlled to provide a desired value of torque or traction. Thus, complete control of the motor is now accomplished through the use of the control loop associated with control 6. Top speed regulator 20 will be similar to top speed regulator 13, preventing abrupt changes at potentiometer 21 being directly transmitted to the real performance control 6.

Since switching between these two modes of operation must be accomplished without jerking, a compensating regulator 22 is provided. The outputs of top speed controller 13 and 20 are subtracted at the input of regulator 22 to provide a signal proportional to their difference. When operating under speed control the output of regulator 22 is provided back to the input of top speed controller 20. Thus through this feedback path, the top speed controller 20 will tend to have an output equal to that of top speed controller 21 so that a smooth switchover will be possible. Similarly, when operating with top speed controller 20, i.e., torque control, the output of the regulator 22 is provided back to the input of the top speed controller 13 thereby causing its output to equal that of top speed controller 20 so that switching back to speed control may be done smoothly.

Thus an improved arrangement for regulating the speed of an asynchronous motor has been shown. Although specific embodiments have been illustrated and described, it will be obvious to those skilled in the art that various modifications may be made without departing from the spirit of the invention which is intended to be limited solely by the appended claims.

What is claimed is:

1. An arrangement for regulating the speed of an asynchronous motor which is supplied with power at a constant frequency and has associated with it a multi-loop regulating circuit comprising:
   a. regulating means including means to develop from a commanded speed and actual speed, a first control signal;
   b. means for measuring the real power being consumed by the asynchronous motor and providing a signal proportional thereto;
   c. an real performance regulator including means to develop from said first control signal and from said signal proportional to the real power a second control signal; and
   d. means responsive to said second control signal to control one of the voltage and current being supplied to the motor.

2. The invention according to claim 1 and further including a minimum value circuit interposed between said real performance controller and said motor control means having as a second input the output of a current limiting regulator which has as inputs a maximum allowable current and the real current being supplied to the motor.

3. The invention according to claim 1 wherein said means to develop said control signal includes a first top speed regulator.

4. The invention according to claim 3 wherein said first top speed regulator obtains its input from an amplifier having as inputs the commanded speed and the actual speed and further including a second minimum value circuit between said amplifier and said first top speed regulator said minimum value circuit having as a second input the output of a regulator having as inputs the output of said actual performance regulator and a constant limiting voltage and further including a series capacitance resistance circuit coupling the output of said first top speed regulator to the input of said amplifier.

5. The invention according to claim 4 and further including a second top speed regulator having as an input the output of a potentiometer and means to switch the input of said real value controller from the output of said first top speed regulator to said second top speed regulator.

6. The invention according to claim 5 and further including a compensating regulator having as inputs the output of said first and second top speed regulators and means to switch the output of said compensating regulator to the input of one of said first and second top speed regulators, said means to switch being coupled to said first switch so that when said first top speed regulator is coupled to said real performance controller the output of said compensating regulator is coupled to the input of said second top speed regulator and when said actual performance controller is coupled to said second top speed regulator the output of said compensating regulator is coupled to the input of said first top speed regulator.

* * * * *